(12) United States Patent
Kubota et al.

(10) Patent No.: US 6,499,461 B2
(45) Date of Patent: Dec. 31, 2002

(54) ADJUSTMENT METHOD AND SYSTEM FOR ADJUSTING VARIOUS TEMPERATURE CHARACTERISTICS

(75) Inventors: Takamitsu Kubota, Kariya (JP); Naoyuki Kamiya, Kariya (JP); Hirofumi Hagio, Handa (JP); Takashi Hamaoka, Kariya (JP)

(73) Assignee: Denso Corporation, Kariya (JP)

( * ) Notice: Subject to any disclaimer, the term of this patent is extended or adjusted under 35 U.S.C. 154(b) by 214 days.

(21) Appl. No.: 09/738,287

(22) Filed: Dec. 18, 2000

(65) Prior Publication Data

US 2001/0004215 A1 Jun. 21, 2001

(30) Foreign Application Priority Data

Dec. 16, 1999 (JP) .......................................... 11-357193

(51) Int. Cl.⁷ .............................................. F02D 41/00
(52) U.S. Cl. ..................................... 123/361; 73/118.1
(58) Field of Search .......................... 123/361; 73/118.1

(56) References Cited

U.S. PATENT DOCUMENTS

| | | | | |
|---|---|---|---|---|
| 5,163,400 A | * | 11/1992 | Yoshioka et al. | ............ 123/361 |
| 5,200,898 A | * | 4/1993 | Yuhara et al. | ............... 123/361 |
| 5,433,283 A | * | 7/1995 | Shultz et al. | ................ 123/361 |
| 5,521,825 A | * | 5/1996 | Unuvar et al. | ............ 123/339.1 |

FOREIGN PATENT DOCUMENTS

| | | |
|---|---|---|
| DE | 4318263 A1 | 1/1995 |
| DE | 4432881 A1 | 3/1996 |
| EP | 0889213 A2 | 6/1998 |
| EP | 0 950 937 A2 | 10/1999 |
| JP | 48-48087 | 7/1973 |
| JP | 2-168181 | 6/1990 |
| JP | 3-44616 | 4/1991 |
| JP | 3-127220 | 12/1991 |
| JP | 8-61910 | 3/1996 |
| WO | WO 99/35468 | 7/1999 |

* cited by examiner

*Primary Examiner*—John Kwon
(74) *Attorney, Agent, or Firm*—Nixon & Vanderhye P.C.

(57) ABSTRACT

Hall ICs constituting a redundant throttle valve position sensor are used to measure a rotational angle value indicative of a position of a throttle valve and a temperature value indicative of an ambient temperature change, which is continuously monitored, around the Hall ICs. The rotational angle value measured by the Hall ICs is appropriately adjusted based on the measure temperature value of its own, and a throttle valve position is determined in an externally connected ECU based on the adjusted angle value. In addition, the temperature value measured by one Hall IC is inputted to the ECU. In the ECU, various control values, such as a resistance value of an electric motor, can be appropriately adjusted based on the measured temperature value.

12 Claims, 5 Drawing Sheets

ADJUSTMENT METHOD AND SYSTEM FOR ADJUSTING VARIOUS TEMPERATURE CHARACTERISTICS

CROSS REFERENCE TO RELATED APPLICATION

This application is based on and incorporates herein by reference Japanese Patent Application No. 11-357193 filed on Dec. 16, 1999.

BACKGROUND OF THE INVENTION

The present invention relates to an adjustment method and system for adjusting temperature characteristics in a position measurement sensor having a non-contact type measurement element for measuring a position of a rotatable body as well as for adjusting temperature characteristics in an electronic control unit that is fed with an output of the position measurement sensor. For instance, such a method and system can be used to adjust temperature characteristics of a control value in a throttle valve position sensor having a non-contact type measurement element (e.g., a Hall element, a Hall IC or the like) for measuring a rotational angle of a throttle valve that adjusts the amount of intake air supplied to an internal combustion engine as well as to adjust temperature characteristics of control values in an electronic control unit provided for controlling the internal combustion engine.

Exemplary prior art publications relevant to the method and system for adjusting the temperature characteristics of the position measurement sensor include Japanese Unexamined Patent Publication No. 48-48087 and Japanese Unexamined Patent Publication No. 2-168181.

The former publication discloses a magnetic sensor having a magneto-resistive element that is connected in series with a diode to temperature-compensate an output voltage of the magnetic sensor. The latter publication discloses a magnetic sensor having a magneto-resistive element. This sensor is supplied with a power supply voltage that has been adjusted for changes in ambient temperature by a positive characteristics temperature sensitive resistive element (positive characteristics thermistor) and a fixed resistor. With this arrangement, an output voltage of the magnetic sensor is temperature-compensated.

To compensate for the influence of the changes in the ambient temperature on the sensor output, the magneto-resistive element of the magnetic sensor is connected in series with the diode in the former publication, and the magneto-resistive element of the magnetic sensor is connected in parallel with the positive characteristics temperature sensitive resistive element in the latter publication.

In both the prior art magnetic sensors, if a large change in ambient temperature occurs at a predetermined level, the sensor output can probably be compensated in consistent with the changes in the ambient temperature. However, for example, if a rotational angle of a rotatable body (e.g., a throttle valve of a vehicle) is to be measured, the above elements, which show constant temperature characteristics, are not sufficient to provide appropriate temperature-compensation. This is due to the fact that an ambient temperature around the sensor, an electric motor for rotating the rotatable body or the like varies depending on its location within the vehicle and also depending on changes in operating condition of the vehicle (i.e., changes in operating condition of the vehicle before, during or after driving the vehicle).

SUMMARY OF THE INVENTION

The present invention addresses the described disadvantages. Therefore, it is an objective of the present invention to provide a method and system for appropriately adjusting temperature characteristics of a position measurement sensor having a non-contact type measurement element for measuring a position of a movable body as well as for appropriately adjusting temperature characteristics of various control values computed in an electronic control unit that is fed with an output of the position measurement sensor.

To achieve the objective of the present invention, there is provided an adjustment method and system. The position measurement sensor used in the method and system has a non-contact type measurement element including a position measurement unit for measuring a position of a movable body. The measurement element further includes a temperature measurement unit integrated therein for continuously measuring an ambient temperature around the measurement element and also includes an output terminal for outputting a position value of the movable body measured by said position measurement unit as well as a temperature monitor terminal for outputting an ambient temperature value measured by the temperature measurement unit. The position value outputted from the output terminal and the ambient temperature value outputted from the temperature monitor terminal are inputted to an externally connected electronic control unit, wherein various control values computed in the electronic control unit are adjusted based on the ambient temperature value outputted from the temperature monitor terminal.

The measurement element can also include a compensation circuit, wherein a position value of the movable body measured by the position measurement unit is temperature compensated in the compensation circuit based on the ambient temperature value measured by the temperature measurement unit before outputting the position value of the movable body to the electronic control unit.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF THE INVENTION

One embodiment of the present invention will now be described with reference to various examples.

Figure 1:
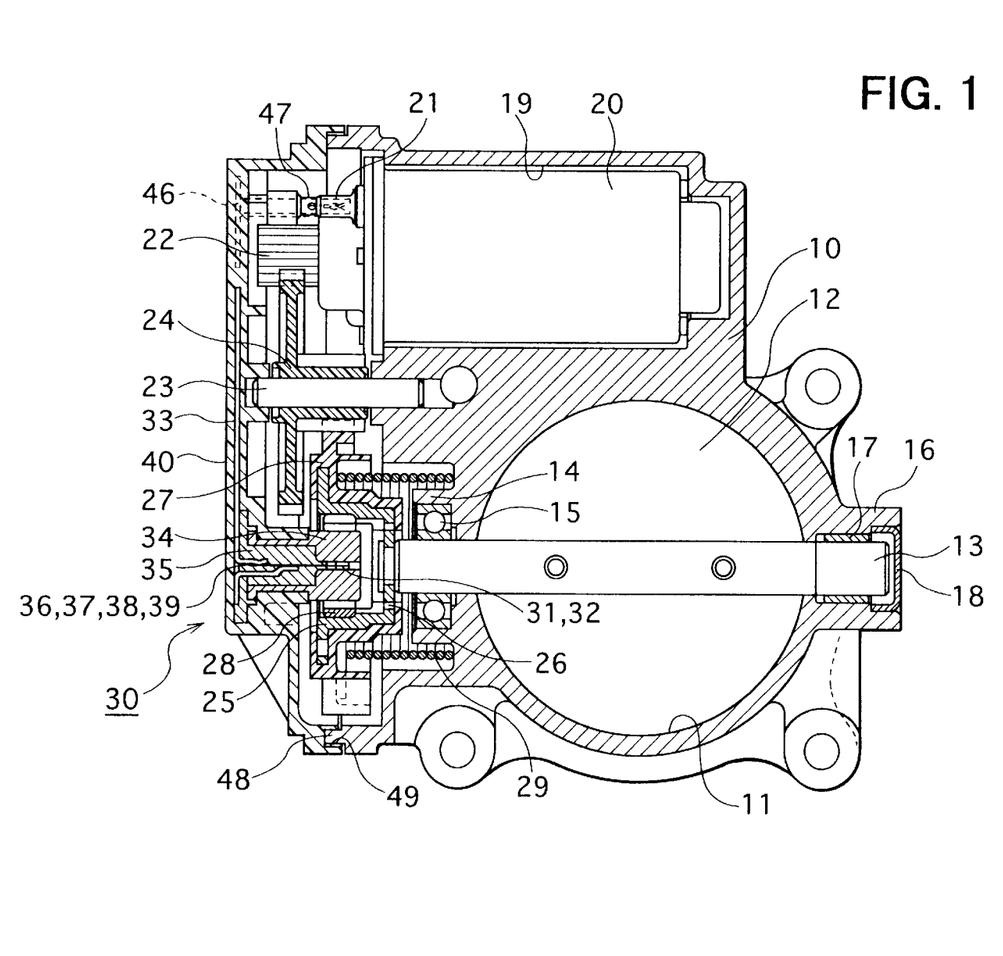
FIG. 1 is a cross-sectional view of an intake air flow control system for an internal combustion engine, to which a adjustment method in accordance with one embodiment of the present invention is applied.

With reference to FIG. 1, an intake air flow control system for an internal combustion engine according to the present embodiment includes a throttle body 10 defining an intake air passage 11 leading to the internal combustion engine (not shown), a substantially disc-shaped throttle valve 12 secured to and supported by a rotatable shaft 13 in a rotatable manner within the intake air passage 11, an electric motor 20 acting as an actuator connected to the rotatable shaft 13 via gears, and a throttle valve position sensor 30 for measuring a throttle valve position as a rotational angle of the throttle valve 12. Output signals, such as those of the throttle valve position sensor 30, are inputted to an electronic control unit (ECU). In the ECU, a drive signal is computed based on an operating condition of the internal combustion engine. Based on the computed drive signal, the electric motor 20 is driven to adjust the position of the throttle valve 12 to a desired position.

The throttle body 10 is manufactured by aluminum die-casting and is secured to an intake manifold (not shown) of the internal combustion engine with, for example, bolts. One end of the rotatable shaft 13 of the throttle valve 12 is rotatably supported by a ball bearing 15 that is in turn supported by a bearing holder 14 of the throttle body 10. Other end of the rotatable shaft 13 is rotatably supported by a thrust bearing 17 that is in turn supported by a bearing holder 16 of the throttle body 10. A cap 18 is fitted into the bearing holder 16 of the throttle body 10. The amount of the intake air supplied to the internal combustion engine is adjusted by an area of an opening that is formed as the throttle valve 12 is rotated relative to the intake air passage 11 of the throttle body 10.

The electric motor 20 is housed in a motor housing 19 defined in the throttle body 10. The motor 20 has a motor power supply terminal 21, which protrudes from the motor 20, and a pinion gear 22, which is fitted around a distal end of an output shaft of the motor 20. Around a rotor 25 that is secured to the one end of the rotatable shaft 13, a resin gear 27 is coupled by insert molding. On an inner peripheral surface of the rotor 25, there is fixedly secured a cylindrical permanent magnet 28. The pinion gear 22 is in gear engagement with the resin gear 27 via an intermediate reduction gear 24 that rotates about a fixed shaft 23 secured to the throttle body 10. Around the outer peripheral of the resin gear 27 that is integral with the rotor 25, there is provided a return coil spring 29 for urging the throttle valve 12 to its initial throttle valve position via the rotatable shaft 13 when the motor 20 is turned off by, for example, turning off an ignition switch (not shown). Positioning holes 26 extend through the rotor 25 for securing the rotor 25 at a position that coincides with an idle position of the rotatable shaft 13.

The throttle valve position sensor 30 includes the cylindrical permanent magnet 28, a couple of Hall ICs 31, 32, a lead frame 33 and a split stator 34. The cylindrical permanent magnet 28 acts as a magnetic field generating source. The Hall ICs 31, 32 act as redundant non-contact type measurement elements and are integrally formed with a resin sensor cover 40. The lead frame 33 is made of a conductive thin metal plate for electrically connecting the Hall ICs 31, 32 with the external ECU. The split stator 34 is made of magnetic material for concentrating the magnetic flux on the Hall ICs 31, 32.

The Hall ICs 31, 32 are opposed to the inner peripheral surface of the permanent magnet 28 to cause generation of electromotive force in response to generation of an N pole magnetic filed or a S pole magnetic field on their magneto-sensitive surfaces (generating a positive (+) electric potential and a negative (−) electric potential by the N pole magnetic field and the S pole magnetic field, respectively). The Hall ICs 31, 32 of the present embodiment are arranged in parallel and are arranged to face in opposite directions (rotated 180 degrees).

Figure 2:
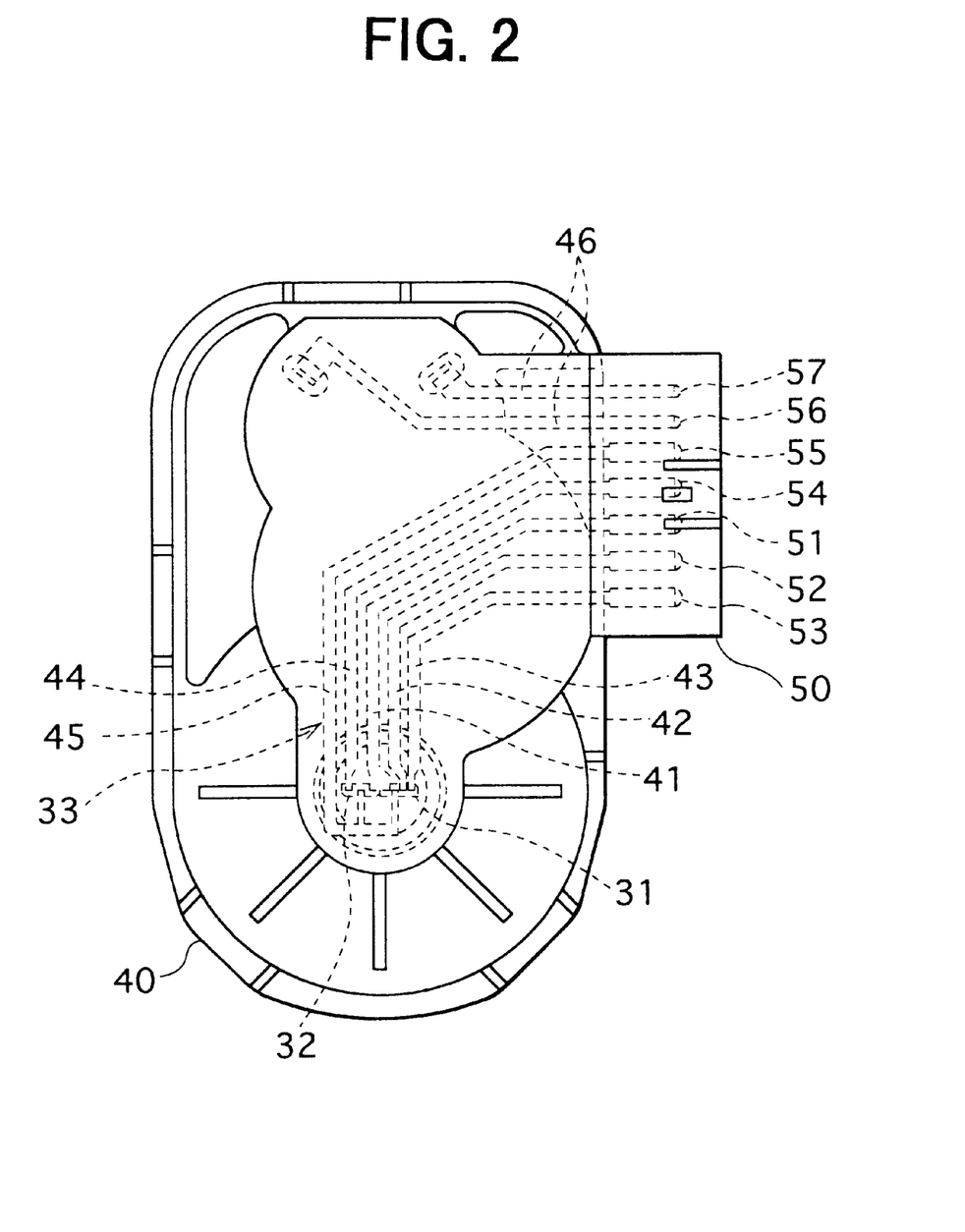
FIG. 2 is a left side view as seen in FIG. 1.

With reference to FIG. 2, the lead frame 33 is made, for example, of a copper plate (conductive thin metal plate). The lead frame 33 includes a signal input terminal (VDD) 41, output terminals (OUT 1, OUT 2) 42, 44, a temperature monitor terminal 43 and a ground terminal (GND) 45. The signal input terminal (VDD) 41 is fed, for example, with a 5 (V) power supply voltage. The output terminals (OUT 1, OUT 2) 42, 44 output a signal indicative of a position of the throttle valve 12. The temperature monitor terminal 43 is connected to a temperature measurement unit integrated into the Hall IC 31 for continuously monitoring the changes in the ambient temperature around the Hall IC 31.

Figure 3:
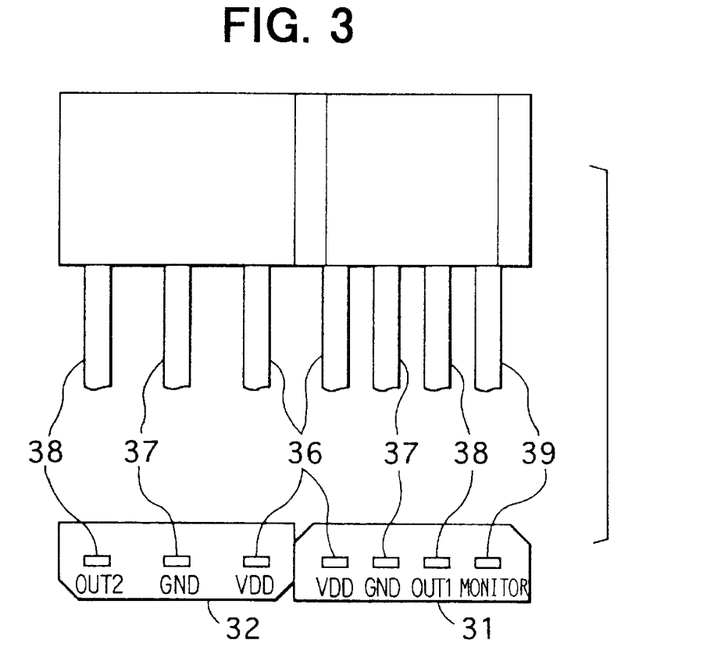
FIG. 3 is a more detailed enlarged view showing a lead structure of two Hall ICs shown in FIG. 2.

With reference to FIG. 3, a lead structure of the Hall ICs 31, 32 includes signal input leads (VDD) 36, ground leads (GND) 37, output leads (OUT 1, OUT 2) 38 and a temperature monitor lead 39 (only for one Hall IC 31). A connection between each lead and a corresponding terminal of the lead frame 33 is covered with a connection holder 35 made of a thermoplastic resin, such as PBT. Two stator halves constituting the split stator 34 are secured around the outer peripheral of the connection holder 35 in a manner that provides a predetermined gap between the stator 34 and the Hall ICs 31, 32.

The sensor cover 40 closes an opening of the throttle body 10. The sensor cover 40 is a thermoplastic resin molded product (such as, one made of PBT), which is lightweight, easy to manufacture and inexpensive and electrically insulates each terminal of the throttle valve position sensor 30 from other terminals. A recess 49 is formed on the sensor cover 40 to engage with a protrusion 48 formed at the opening side of the throttle body 10. Upon engagement of the recess 49 and the protrusion 48, the sensor cover 40 is secured to the throttle body 10 by a clip (not shown), completing the assembling of the sensor cover 40 and the throttle body 10. When the protrusion 48 of the throttle body 10 is engaged with the recess 49 of the sensor cover 40, the Hall ICs 31, 32, which are secured on the sensor cover 40, are correctly aligned with the permanent magnet 28, which is secured to the inner peripheral side of the rotor 25 that integrally rotates with the rotatable shaft 13 of the throttle valve 12.

Furthermore, as shown in FIG. 2, the connector 50 that is integrally formed on a lateral side surface of the sensor cover 40 has a distal end 51 of the signal input terminal 41, a distal end 52 of the output terminal 42, a distal end 53 of the temperature monitor terminal 43, a distal end 54 of the output terminal 44, a distal end 55 of the ground terminal 45 and distal ends 56, 57 of a motor power feed terminal 46 of the motor 20. Other ends of the motor power feed terminal 46 are integrally connected with a motor connection terminal 47. Once the throttle body 10 is assembled with the sensor cover 40, the motor power supply terminal 21 of the motor 20 is connected to the motor power feed terminal 46 via the motor connection terminal 47.

A flow of throttle valve position information and a flow of temperature information provided through an internal computation in the Hall ICs 31, 32 will now be described with reference to FIG. 4.

Figure 4:
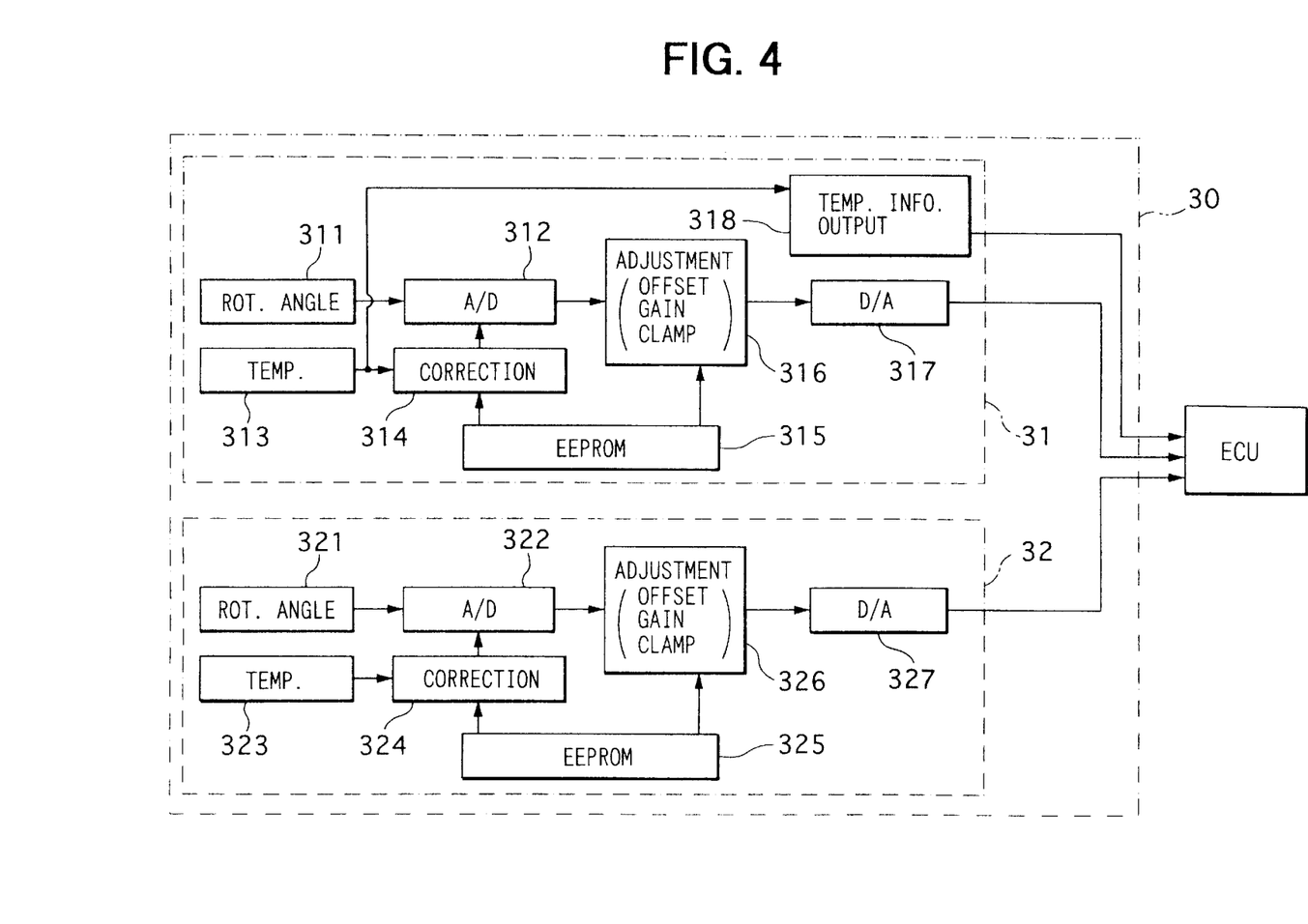
FIG. 4 is a block diagram showing a flow of throttle valve position information and a flow of temperature information provided through an internal computation within the Hall ICs, which constitute the throttle valve position sensor of FIG. 1.

With reference to FIG. 4, a rotational angle value indicative of a position of the throttle valve 12 is measured with a rotational angle measurement unit 311, 321 via a Hall element in each Hall IC 31, 32. The measured rotational angle value is then inputted to an A/D converter 312, 322. Furthermore, a temperature value indicative of a change in the ambient temperature is measured with a temperature measurement unit 313, 323 in each Hall IC 31, 32. The measured temperature value is then inputted to a correction circuit 314, 324 for correcting temperature characteristics.

A corresponding set point for the measured temperature value previously stored in an EEPROM (Electrical Erasable Programmable ROM) 315, 325 is inputted to the correction circuit 314, 324, and the measured temperature value is corrected based on the set point in the correction circuit 314, 324 and is then inputted to the A/D converter 312, 322. The value inputted to the A/D converter 312, 322 is converted from analog to digital and is then inputted to an adjustment circuit 316, 326. In the adjustment circuit 316, 326, an offset adjustment, a gain adjustment and a clamp adjustment are carried out based on a corresponding set point stored in the EEPROM 315, 325. In the offset adjustment, an offset of the output (V) indicative of the throttle valve position (degrees) is adjusted. In the gain adjustment, a slope of the output (V) indicative of the throttle valve position (degrees) is adjusted. In the clamp adjustment, an upper clamp voltage (V) and a lower clamp voltage (V), which are used as a maximum output voltage and a minimum output voltage of the throttle valve position sensor 30, respectively, are set.

The value adjusted in each adjustment circuit 316, 326 is inputted to a D/A converter 317, 327 to convert from digital to analog and is then outputted as the throttle valve position information from the output lead (OUT 1, OUT 2) 38 of the Hall IC 31, 32 to the external ECU that is connected to the connector 50 via the distal end 52, 54 of the output terminal 42, 44 of the lead frame 33. In the Hall IC 31, the temperature value measured by the temperature measurement unit 313 is also inputted to the temperature information output circuit 318. The temperature information of the temperature information output circuit 318 is outputted from the temperature monitor lead 39 to the external ECU that is connected to the connector 50 via the distal end 53 of the temperature monitor terminal 43 of the lead frame 33.

A control value computing operation carried out in the ECU for the motor 20 of the intake air flow control system provided for the internal combustion engine will now be described with reference to a block diagram of FIG. 5.

Figure 5:
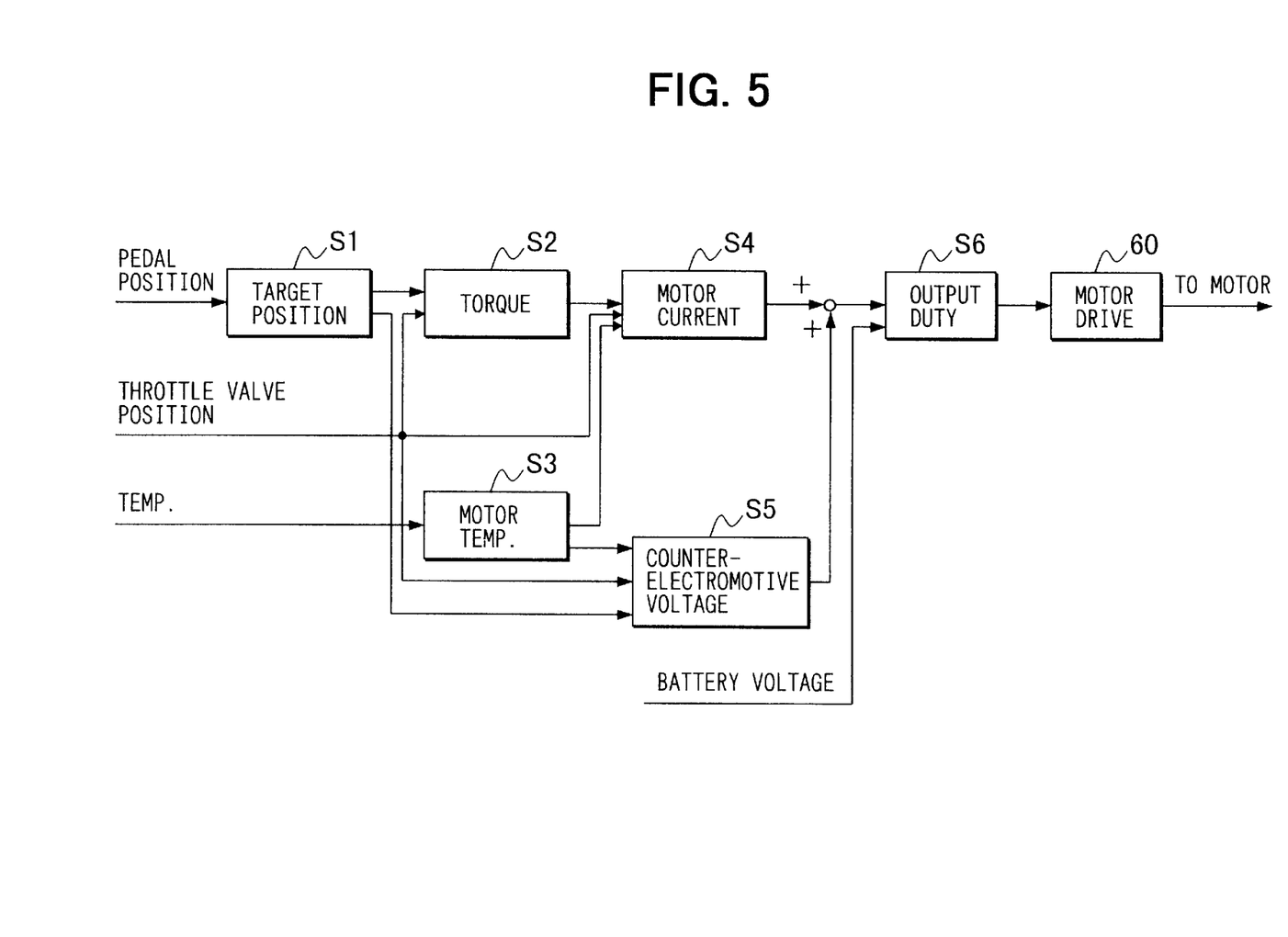
FIG. 5 is a block diagram showing steps carried out in an ECU for computing a control value for the motor of FIG. 1.

With reference to FIG. 5, first, in a target throttle valve position computing operation S1, a target throttle valve position is computed based on an accelerator pedal position information received from an accelerator pedal position sensor (not shown). Then, in an acceleration/deceleration torque computing operation S2, an acceleration/deceleration torque for a throttle control system is computed based on a deviation between the target throttle valve position computed in the target throttle valve position computing operation S1 and the throttle valve position obtained based on the throttle valve position information received from the throttle valve position sensor 30. Other torque components in the throttle control system are not discussed for the sake of brevity.

In a motor temperature computing operation S3, a temperature of the motor 20 that is located adjacent to the throttle valve position sensor 30 is computed based on the temperature information provided from the throttle valve position sensor 30. Then, in a motor current computing operation S4, a required torque, for example, for achieving the computed acceleration/deceleration torque that is computed in the previous operation is used as a parameter, and a motor current of the motor 20 necessary for generating the required torque is computed based on the throttle valve position. The motor current of the motor 20 is corrected based on the temperature of the motor 20 computed in the motor temperature computing operation S3.

In a counter-electromotive voltage computing operation S5, a counter-electromotive voltage is computed based on the motor current of the motor 20 that is computed in the previous operation, the target throttle valve position computed in the target throttle valve position computing operation S1, the temperature of the motor 20 computed in the motor temperature computing operation S3 and the throttle valve position information received from the throttle valve position sensor 30. Then, in an output DUTY computing operation S6, an electric current value corresponding to the counter-electromotive voltage is added to the motor current of the motor 20 computed in the previous operation, and an output DUTY that is to be actually outputted to the motor 20 is computed upon consideration of a vehicle battery voltage. The above operations S1 to S6 are executed by a microcomputer used in the ECU.

In a motor drive circuit 60 in the ECU, the output electric current DUTY to be outputted to the motor 20 is provided based on the output DUTY obtained in the output DUTY computing operation S6 and is supplied to the motor 20 to drive the motor 20 for adjusting the throttle valve position measured by the throttle valve position sensor 30 to coincide with the target throttle valve position. In the above-described manner, the throttle valve position sensor 30 continuously monitors the changes in the ambient temperature around it. Furthermore, a change in the motor torque of the motor 20, a change in the magnetic flux density, a change in the friction torque and the like are corrected based on the changes in the ambient temperature. As a result, the appropriate output electric current DUTY that is to be outputted from the motor drive circuit 60 to the motor 20 can be provided.

A PI (proportional integral) gain computing process in a feedback control operation of the motor 20 carried out by the microcomputer in the ECU will now be described with reference to a flowchart of FIG. 6. The feedback control operation adjusts the position of the throttle valve 12 of the intake air flow control system provided for the internal combustion engine. The feedback control is carried out by a PID control (Proportional Integral Differential Control). The PI gain computing routine is repeated in the ECU at predetermined time intervals.

Figure 6:
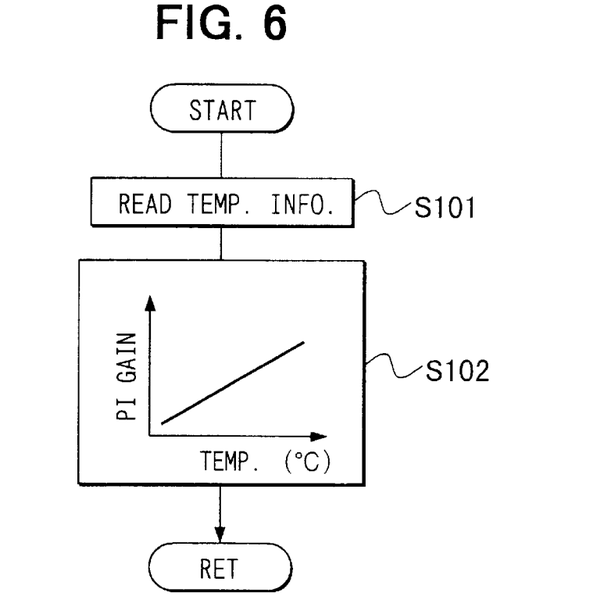
FIG. 6 is a flowchart showing steps carried out in the ECU for computing a PI gain in a feedback control of the motor shown in FIG. 1 that is conducted by use of PID control.

In FIG. 6, the temperature information from the throttle valve position sensor 30 is read in step S101. Then, control passes to step S102 where a PI gain is computed with reference to the map based on the temperature (degrees Celsius) read in step S101. Then, the routine is terminated. A relationship between the temperature and the PI gain shows a positive relationship. That is, as the temperature increases, the IP gain increases.

As described above, in the adjustment of temperature characteristics of the rotational angle measurement sensor according to the present embodiment, the Hall ICs 31, 32 are provided as the non-contact type measurement elements for measuring the throttle valve position (rotational angle) of the throttle valve (rotatable body) 12. Each Hall ICs 31, 32 includes the temperature measurement unit 313, 323 integrated therein for continuously monitoring the changes in the ambient temperature around it. One Hall IC 31 has the output terminal 42 for outputting a measured rotational angle value indicative of the position of the throttle valve 12 as well as the temperature monitor terminal 43 for outputting an ambient temperature value measured by the temperature measurement unit 313. The measured rotational angle value outputted from the output terminal 42 and the measured temperature value outputted from the temperature monitor terminal 43 are simultaneously inputted to the external ECU (not shown). Then, in the ECU, the various control values computed therein are adjusted based on the measured temperature value received from the temperature monitor terminal 43.

That is, the Hall ICs 31, 32 constituting the redundant throttle valve sensor (rotational angle measurement sensor) 30 include the rotational angle measurement unit 311, 321 for measuring the rotational angle value indicative of the position of the throttle valve 12 as well as the temperature measurement unit 313, 323 for continuously measuring the temperature value indicative of the change in the ambient temperature around it. The rotational angle value measured by the Hall ICs 31, 32 is appropriately adjusted based on the measured temperature value of its own and then is inputted to the external ECU connected to the output terminals 42, 44 to determine the position of the throttle valve 12. Furthermore, the temperature value measured by the temperature measurement unit 313 of one Hall IC 31 is inputted to the external ECU, and the various control values computed in the ECU are adjusted based on the measured temperature value. That is, the measured rotational angle value indicative of the position of the throttle valve 12 as well as the measured ambient temperature value are outputted from the one Hall IC 31 constituting the throttle valve position sensor 30. As a result, in the external ECU, in addition to the position of the throttle valve 12 measured by the throttle valve position sensor 30, the various control values can be appropriately adjusted based on the measured ambient temperature value.

Furthermore, a measured resistance value, a measured inductance value, a measured torque value and/or the like of the motor 20, which changes in consistent with the changes in the ambient temperature, can be appropriately adjusted based on the measured temperature change to provide the feedback control of the motor 20. The above-described adjustment of the temperature characteristics of the rotational angle measurement sensor can be summarized as follows. That is, the various characteristics of the motor 20, which is positioned adjacent to the throttle valve 12 for rotating the same, are adjusted based on the measured temperature value outputted from the temperature monitor terminal 43.

Under a certain temperature condition encountered before during or after driving the vehicle, for example, under the high extraordinary temperature condition right after driving the vehicle, the measured temperature value may not be used in the ECU for learning a reference position of the throttle valve. In this way, the effects on the normal sensor outputs can be excluded to allow consistent sensor output correction. Alternatively, upon correction of the measured temperature value, the corrected temperature value can be stored for use in the reference position learning process, so that even if the temperature changes, a consistent reference position of the throttle valve can be detected.

Additional advantages and modifications will readily occur to those skilled in the art. The invention in its broader terms is therefore, not limited to the specific details, representative apparatus, and illustrative examples shown and described. For instance, the present invention may be applied to control a position of a movable body, which moves linearly.

What is claimed is:

1. An adjustment method with use of an output of a position measurement sensor, wherein said position measurement sensor has a non-contact type measurement element including a position measurement unit for measuring a position of a movable body, wherein:

said measurement element further includes a temperature measurement unit integrated therein for measuring an ambient temperature around said measurement element and also includes an output terminal for outputting a position value of said movable body measured by said position measurement unit as well as a temperature monitor terminal for outputting an ambient temperature value measured by said temperature measurement unit; and said position value outputted from said output terminal and said ambient temperature value outputted from said temperature monitor terminal are inputted to an externally connected electronic control unit, wherein control values computed in said electronic control unit are adjusted based on said ambient temperature value outputted from said temperature monitor terminal.

2. An adjustment method with use of an output of a position measurement sensor according to claim 1, wherein characteristics of an electric motor arranged adjacent to said movable body for moving said movable body are adjusted based on said ambient temperature value outputted from said temperature monitor terminal.

3. An adjustment method with use of an output of a position measurement sensor, wherein said position measurement sensor has a non-contact type measurement element including a position measurement unit for measuring a position of a movable body, wherein:

said measurement element further includes a temperature measurement unit integrated therein for measuring an ambient temperature around said measurement element and also includes a compensation circuit, wherein a position value of said movable body measured by said position measurement unit is temperature compensated in said compensation circuit based on an ambient temperature value measured by said temperature measurement unit;

said measurement element further includes an output terminal for outputting said temperature-compensated position value of said movable body as well as a temperature monitor terminal for outputting said ambient temperature value measured by said temperature measurement unit; and said temperature-compensated position value of said movable body outputted from said output terminal and said ambient temperature value outputted from said temperature monitor terminal are inputted to an externally connected electronic control unit for further processing.

4. An adjustment method with use of an output of a position measurement sensor according to claim 3, wherein control values computed in said electronic control unit are adjusted based on said ambient temperature value outputted from said temperature monitor terminal.

5. An adjustment method with use of an output of a position measurement sensor according to claim 3, wherein characteristics of an electric motor arranged adjacent to said movable body for moving said movable body are adjusted based on said ambient temperature value outputted from said temperature monitor terminal.

6. An adjustment method according to claim 1, wherein said movable body is a throttle valve that adjusts an amount of intake air supplied to an internal combustion engine.

7. An adjustment system including a position measurement sensor, wherein said position measurement sensor has a measurement element including a position measurement unit for measuring a position of a movable body, wherein:

said measurement element further includes a temperature measurement unit integrated therein for measuring a temperature around said measurement element and also includes an output terminal for outputting a position value of said movable body measured by said position measurement unit as well as a temperature monitor terminal for outputting a temperature value measured by said temperature measurement unit; and said adjustment system further includes an electronic control unit that is externally connected to said position measurement sensor, wherein said position value outputted from said output terminal and said temperature value outputted from said temperature monitor terminal are inputted to said electronic control unit, wherein control values computed in said electronic control unit are adjusted based on said temperature value outputted from said temperature monitor terminal.

8. An adjustment system according to claim 7, wherein said temperature value inputted to said electronic control unit from said temperature monitor terminal is used to adjust characteristics of an electric motor arranged adjacent to said movable body for moving said movable body.

9. An adjustment system including a position measurement sensor, wherein said position measurement sensor has a measurement element including a position measurement unit for measuring a position of a movable body, wherein:

said measurement element further includes a temperature measurement unit integrated therein for measuring a temperature around said measurement element and also includes a compensation circuit, wherein a position value of said movable body measured by said position measurement unit is temperature compensated in said compensation circuit based on a temperature value measured by said temperature measurement unit;

said measurement element further includes an output terminal for outputting said temperature-compensated position value of said movable body as well as a temperature monitor terminal for outputting said temperature value measured by said temperature measurement unit; and said adjustment system further includes an electronic control unit that is externally connected to said position measurement sensor, wherein said temperature-compensated position value of said movable body outputted from said output terminal and said temperature value outputted from said temperature monitor terminal are inputted to said electronic control unit for further processing.

10. An adjustment system according to claim 9, wherein said temperature value inputted to said electronic control unit from said temperature monitor terminal is used to adjust control values computed in said electronic control unit.

11. An adjustment system according to claim 9, wherein said temperature value inputted to said electronic control unit from said temperature monitor terminal is used to adjust control characteristics of an electric motor arranged adjacent to said movable body for moving said movable body.

12. An adjustment system according to claim 7, wherein said movable body is a throttle valve that adjusts an amount of intake air supplied to an internal combustion engine.

* * * * *